United States Patent [19]

Merz

[11] Patent Number: 4,812,085
[45] Date of Patent: Mar. 14, 1989

[54] CONDUIT FOR TRANSPORTING FINELY-DIVIDED OR FINE-GRANULAR, DRY BULK MATERIALS AND A PROCESS FOR OPERATION OF SAME

[75] Inventor: Walter Merz, Küsnacht, Switzerland

[73] Assignee: Swiss Aluminium Ltd., Chippis, Switzerland

[21] Appl. No.: 815,019

[22] Filed: Dec. 30, 1985

[51] Int. Cl.⁴ .............................................. B65G 53/18
[52] U.S. Cl. ........................................ 406/88; 406/89; 406/95
[58] Field of Search ................... 406/86, 88, 89, 95, 406/191

[56] References Cited

U.S. PATENT DOCUMENTS

| Re. 24,716 | 10/1959 | Anselman et al. | 406/95 |
| 2,805,898 | 9/1957 | Willis, Jr. | 406/88 |
| 4,160,567 | 7/1979 | Merz | 406/89 |
| 4,395,165 | 7/1983 | DeRobertis et al. | 406/88 |
| 4,561,806 | 12/1985 | Lenhart | 406/88 |

FOREIGN PATENT DOCUMENTS

| 1150320 | 6/1963 | Fed. Rep. of Germany | 406/89 |
| 151726 | 11/1981 | German Democratic Rep. | 406/89 |
| 131681 | 11/1978 | Japan | 406/191 |
| 135031 | 8/1983 | Japan | 406/89 |

Primary Examiner—Andres Kashnikow
Attorney, Agent, or Firm—Bachman & LaPointe

[57] ABSTRACT

A conduit for transporting finely-divided or fine-granular, dry bulk materials comprises a material conveyance zone and a zone for introducing the fluidizing medium separated from the first mentioned zone by a material which is permeable to gas and fluids. This conduit comprises at least one each of a closed feeder channel, a closed fluidizing channel and between these a fluidizing base. It runs approximately horizontal. In and/or above the fluidizing base are impeller nozzles with at least one outlet opening for a gaseous or fluid impeller medium. The fluidizing medium is introduced into the feeder channel/feeder channels at a positive pressure of 100–500 mm water column and the impeller medium at a positive pressure of 700–1500 mm water column.

23 Claims, 5 Drawing Sheets

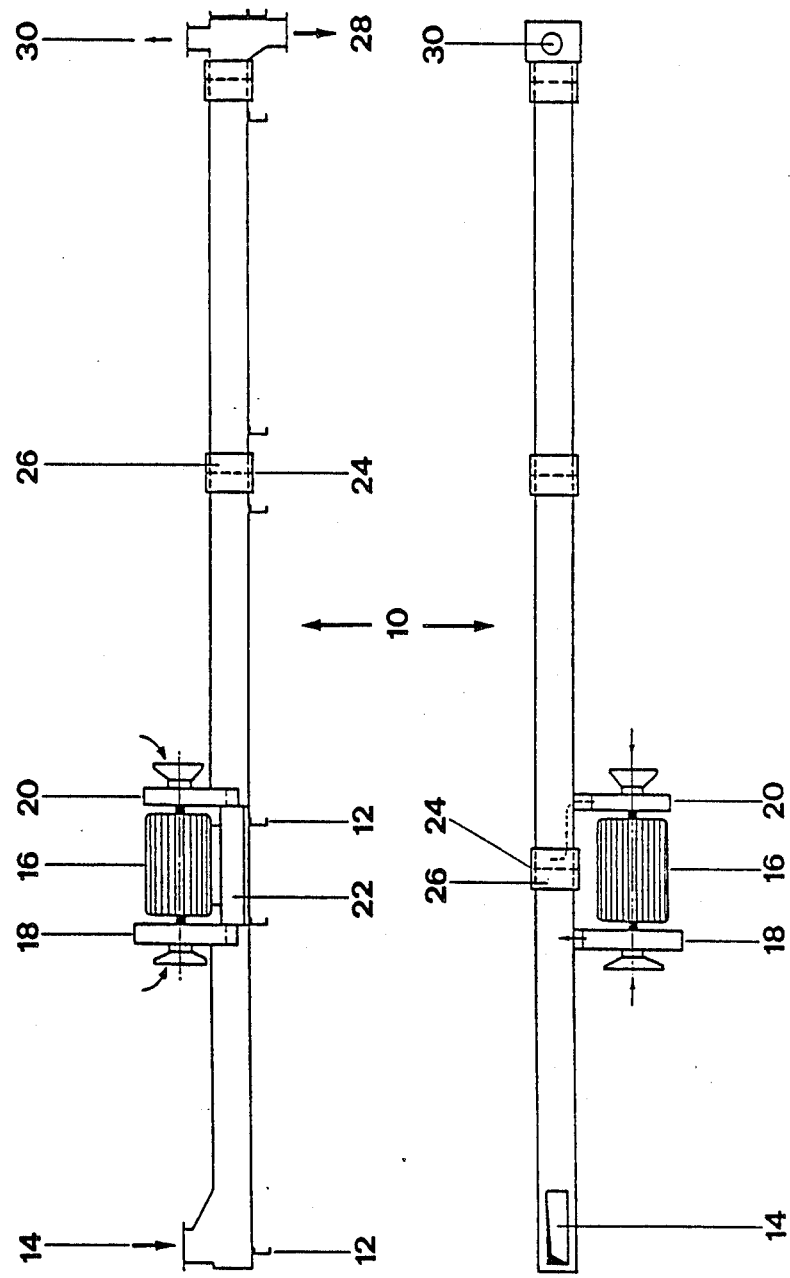

CONDUIT FOR TRANSPORTING FINELY-DIVIDED OR FINE-GRANULAR, DRY BULK MATERIALS AND A PROCESS FOR OPERATION OF SAME

BACKGROUND OF THE INVENTION

The invention relates to a conduit for transporting finely-divided or fine-granular, dry bulk materials having a material conveyance zone and a zone for introducing the fluidizing medium separated from the first mentioned zone by a material which is permeable to gas and fluids. Further, the invention also relates to a process for operation of the said conduit.

Special bulk material conveyance means have been in existance for a long time and have been successfully employed in industry i.e. conveyance means which convert finely-divided and fine-granular, dry bulk materials into a fluid-like state with the aid of fluidizing gases. This causes the friction between the particles to fall to a very low value so that the bulk material behaves similar to a fluid.

If air, for example, is introduced through a porous base into bulk material resting on that base, and the device is in the form of a trough and is inclined downwards at a small angle of about 1° to 6° to the horizontal, then the bulk material will flow under the action of the force of gravity. Such conveyance means are known in industry as pneumatic conveyance conduits, airslides or fluidizing troughs.

The basic requirements for conduit transportation are the ability to fluidize the bulk material and the presence of a geodetic drop in elevation. If both of these conditions are met then conduit transport is, compared with other means of transport, very economical.

The principle of the fluidizing conduit is described for example in the manuals "Fördertechnik" 1967, VEB Publishers Technik, Berlin, on pages 280 and 281, and in Techniker-Handbuch, 1979 edition, published by Friedrich Vieweg and Son, Braunschweig/Wiesbaden.

Fluidizing conduits are employed for example in the cement, aluminum, chemical and foodstuffs industries. Significant advantages over mechanical means of conveyance are the simple construction, low energy consumption and thus better economics.

Depending on the nature of the bulk material, conveyance capacity and distance to be transported, a conduit with drop of up to 10% consumes between 0.04 and 0.075 kWh/t for transportation over a distance of 100 m. By comparison, the energy consumption for low density transportation over 100 mm is 1.5 to 3 kWh/t, likewise for a drop of 10%.

All known conduits of this kind, however, suffer a significant disadvantage in that transportation is possible only when there is a continuous drop in height. This places limits on the distance over which the bulk material can be transported using this means.

The object of the present invention is therefore to overcome this disadvantage and to develop a device which permits the use of a horizontal or even slightly upwards sloping conduit without having to sacrifice the economic advantages.

SUMMARY OF THE INVENTION

This object is achieved with respect to the device by way of the invention in that the conduit runs approximately horizontally and comprises at least one closed feeder channel, a closed fluidizing channel and between these channels a fluidizing base, and features in and/or on the fluidising base impeller nozzles with at least one outlet for a gaseous or fluid impeller medium.

BRIEF DESCRIPTION OF THE DRAWINGS

The invention is explained in greater detail in the following with the aid of examples illustrated by way of schematic elevations and cross-sections viz., FIG. 1: The basic concept of a conduit for bulk material transport shown here as a front elevation.

FIG. 2: A plan view of FIG. 1.

DETAILED DESCRIPTION

Figure 3:
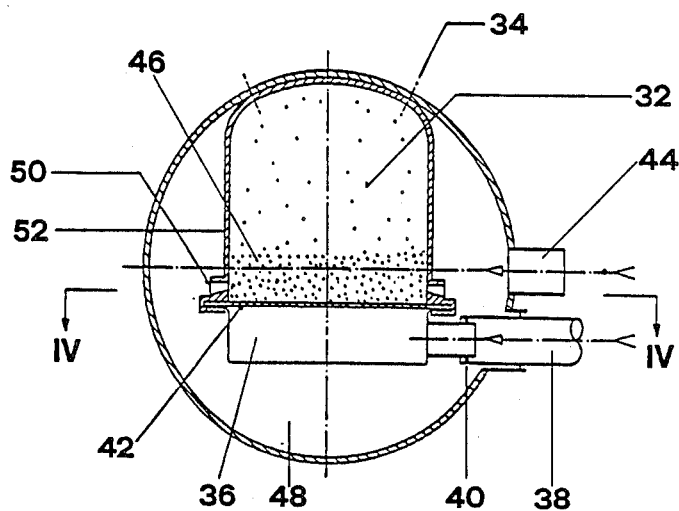
FIG. 3: A cross-section through a conduit with one feeder channel.

In general the conduit lies horizontal. The overall concept of the construction of the bulk transport facility can make it necessary that:

the conduit slopes downwards slightly, whereby however the force of gravity is not yet sufficient for economic transportation of the bulk material, for example at a downwards inclination of up to 2°, or the conduit must be arranged such that it has a slight upwards slope.

When the conduit slopes downwards slightly, the energy consumption is smaller, if sloping upwards slightly, then correspondingly larger. As a rule the conduit according to the invention permits upwards slope of up to 10° to be overcome economically.

The fluidizing base is designed in a conventional manner and is made up of fabric (e.g. of cotton, cotton-artificial fibre or polyester fibres), open-pored sintered metal or ceramic slabs.

A gas or fluid is employed as impeller medium. Depending on the type of medium one differentiates between pneumatically or hydraulically powered conduits. In practice one mainly employs air for this purpose. However, in order to create or prevent chemical reactions or to heat or cool an appropriate impeller medium can be employed.

It has been found favorable to enclose the conduit, comprising one or more feeder channels or fluidizing channels in a closed outer pipe. This pipe is, for example, 5–80 cm in diameter depending on the capacity of the conduit, and can be equally well made of metal, in particular steel or aluminum, or of a pressure-resistant plastic. The outer pipes are with respect to their cross-section preferably circular in shape in order that they can be joined together by a simple coupling means.

Usefully, the impeller medium is introduced into the air-tight outer pipe and fills the space inside not occupied by the feeder channel or channels and the fluidizing channel or channels. The medium can then pass from the communicating space via the impeller nozzles into the feeding channel.

The impeller nozzles, situated in the lowest region of the sidewall of the feeder channel/channels at a height of for example 1–5 cm, are arranged at the same points on the opposite sidewall. If these nozzles were arranged in an alternating manner, the bulk material would be tossed about during the forward movement, causing additional dust to form and resulting in a lower degree of efficiency. In practice it has been shown to be advantageous to arrange all the nozzles at the same level and spaced 3–10 cm apart.

In a wide feeding channel the impeller nozzles at the side gradually lose their effect towards the middle. For this reason one of the two following measures is usefully taken with feeder channels wider than 10 cm:

Instead of one feeder channel a plurality of separated feeder channels is created with impeller nozzles in the sidewalls that are fed impeller medium from the inner space in the pipe.

At least one pipe is inserted in the direction of material conveyance at the same height as the impeller nozzles in the sidewalls; the said pipe features on both sides impeller nozzles which correspond to those in the sidewalls. Instead of a pipe, a wall which features impeller nozzles and at least partly divides the feeding channel can be inserted.

The impeller nozzles form in the horizontal plane an angle α of preferably 10°–30° with the sidewalls of the feeder channel/channels, pipe or dividing wall. The impeller medium is then injected into the bulk material in such a manner that the main component of thrust acts in the direction of transportation. The transport medium, however, also pushes towards the middle of the feeder channel and so generates an approximately laminar flow pattern. The impeller nozzles are created out of the walls themselves, installed as a separate part or shaped there. According to one version they are as inserts in the form of individual nozzles or nozzle strips. The preferred circular bore of the nozzle is for example 1–2 mm in diameter. However, vertical or almost vertical slits with a corresponding horizontal angle α can also be made or such nozzles inserted.

In a wide feeder channel the impeller nozzles are preferably fixed into the fluidizing base. These can act alone on the bulk material or in cooperation with the above described nozzles in the sidewalls of the feeder channel.

The nozzles penetrating the fluidizing base are anchored in a supporting base. These nozzles have a vertical bore which connects up to an exit bore that points slightly upwards. The exit bore of this impeller nozzle is not horizontal so that the fluidizing base is not jetted and thus worn away.

The impeller nozzles embedded in the support base are, in accordance with the structure of this base, uniformly arranged, and can be at a spacing of 2–5 cm transverse to the direction of transportation and 3–10 cm in the direction of transportation.

The nozzles are shaped and installed such that the tendency for build-up is as small as possible. The following measures can be taken to minimize this build-up tendency further:

The axes of the exit bores do not run exactly in the direction of transport but are slightly turned away from this such that the distance of the vertical plane through the longitudinal axis of an impeller nozzle to the vertical axis of the next nozzle in the direction of material transport is, usefully, 2–3 times the diameter of the exit opening and/or the impeller nozzles are arranged alternatingly in the direction of material transport.

The impeller nozzles deviate therefore only little from the direction of material transport, as a rule at most 5°, as with increasing deviation the energy consumption is increased significantly.

As the fluidizer and impeller media unite in the feeder channel, they are usefully of the same substance. The media can then, without problem, originate from the same power source, but they must be introduced into the conduit in different pipelines.

The conduit according to the invention is in special applications suitable for performing other functions apart from purely transportation. The feeder channel or the feeder channels, fluidizing channel or fluidising channels and/or the channel or channels for the impeller medium can have devices built in to heat or cool, separate or screen, combust and/or adsorb the bulk material. Appropriate devices for the desired side reaction are installed and the material treated in the conduit.

The whole conduit is conceived such that no bolts are necessary.

The process according to the invention for operating the device of the invention is such that the fluidizing medium is introduced into the feeder channel/feeder channels at a positive pressure of 100–500 mm water column and the impeller medium at a positive pressure of 700–1500 mm water column.

This relatively small positive pressure is, in the case of liquid impeller media, usefully generated with two pumps, in the case of a gaseous impeller medium usefully with two blowers. By introducing suitable reduction pieces both, different pressures can however also be generated using one pump or blower.

Although the bulk material is transported through the conduit with as laminar flow as possible, some dust is formed in the upper part of the feeder channel or feeder channels; for that reason this is/these are closed over. A relative negative pressure of, for example, 20 mm water column is preferably created in the feeder channel/feeder channels; as a result the dust charged atmosphere is sucked away and led off to scrubbers.

The invention can be employed for all particulate bulk materials of particle size ≦1 mm e.g.

In the aluminum industry for transferring alumina to silos, to smelters and for feeding the pot lines; further, for adsorption of fluorides on alumina, sulphur on chalk and sulphurous and pitch vapors on carbon.

In coal-fired power stations for transporting the pulverised coal and for transporting and cooling ashes.

In the chemical industry for transporting cooling or heating vinyl and styrol powders, soot, fertilizers, ureas, carbides and abrasive materials.

In the wood and paper industry for transporting sawdust, fillers for paper and chemicals for bleaching.

In the cement industry for transporting and cooling powdered brick and additives for manufacturing bricks, portland cement, ground coal and chalk.

The device according to the invention is well suited to the transportation of bulk materials of 100 to 1000 tons per hour. Referring to the drawings, the conduit 10 shown in FIGS. 1 and 2 rests on a supporting construction 12. The inlet 14 for the bulk material and the first element of the conduit are in one piece. In the region where the second and third elements of the conduit 10 are joined there is a blower for compressed air which is used both as a fluidizer medium and as an impeller medium. Blower 18 introduces compressed air to the fluidizing base and blower 20 compressed air to the impeller nozzles. The air inlet to the blowers is indicated by arrows.

The electromotor 16 and blowers 18,20 are supported by a console 22 which in FIG. 1 conceals the conduit joint 24. A conventional coupling 26 is provided at the joint 24 and ensures an air-tight connection of the conduit elements.

Provided at the end of the conduit 10 is an end element which features a material outlet 28 at the bottom and a ventilating outlet 30 at the top.

The conduit shown in FIG. 3 has a feeder channel 32 which is slightly larger than 10 cm wide. This matches the outer pipe 34 at the top where it is joined to the outer pipe.

Below the feeder channel 32 is a fluidizing channel 36 of the same width to which a pipeline 38 supplying the fluidizing air is connected. This pipeline 38 comprises pipes fitted in to one another with a sealing ring 40 to ensure air-tightness.

The fluidizing base 42 is arranged horizontally between the fluidizing and feeder channels. The fluidizing base 42 is made of a polyester fiber fabric, and is flanged and glued at the sides along the whole length.

Resting on the fluidizing base 42 is an approximately 7 cm deep layer of bulk material, a part of which has been stirred up thus forming dust.

A pipeline 44 supplying air as impeller medium connects up with the outer pipe 34. This air fills the whole of the space 48 in the outer pipe 34 which is not occupied by the feeder channel 32, fluidizing channel 36 and the supply pipes, and enters the fluidized bulk material via impeller nozzles 50 situated in the lowest region of the sidewalls 52 of the feeder channel 32, thus pushing the bulk material forwards in the direction it is to be transported.

Figure 4:
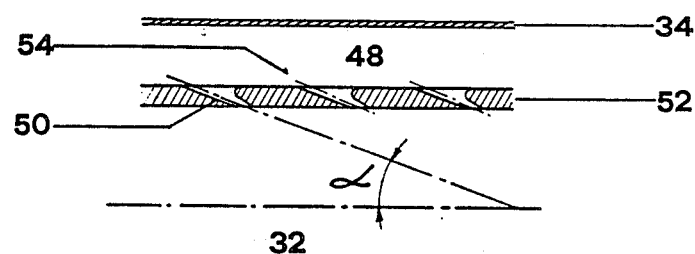
FIG. 4: A horizontal section along line IV—IV in FIG. 3.

FIG. 4 shows clearly how the impeller nozzles 50 are arranged in the sidewalls 52 of the feeder channel 32 at an angle $\alpha$ of about 25° and, as a result, the inflowing air pushes forward the bulk material, which is not shown here. Not visible here is that the impeller nozzles 50 are inclined slightly upwards from the horizontal plane by 2°–5° so that the fabric of the fluidizing base is not jetted by the bulk material.

The impeller nozzles 50 here have been formed out of the sidewall 52 of the feeder channel 32. They can, however, also be manufactured by die casting or precision casting and installed individually or in strip form.

In FIG. 4 the angle $\alpha$ is 30°. The air flowing through the space 48 into the impeller nozzles 50 is indicated by an arrow 54.

Figure 5:
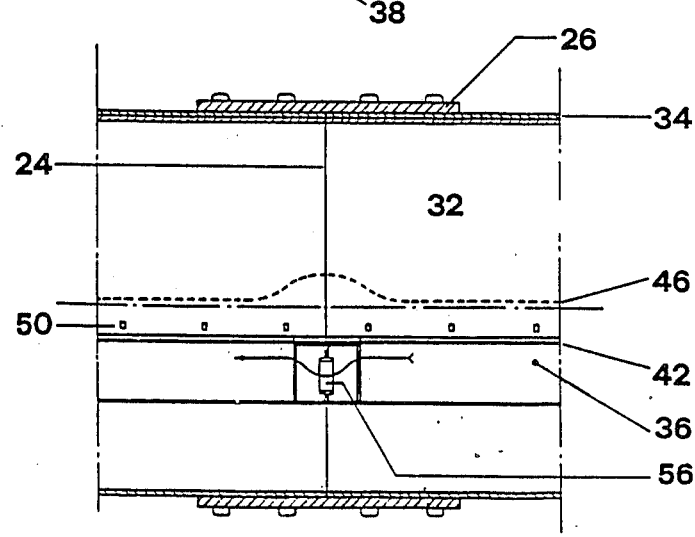
FIG. 5: A vertical longitudinal section through the axis of FIG. 3.

FIG. 5 illustrates a conduit joint 24. The circular outer pipes 34 of the conduit are locked together in an air-tight manner at the joint by a coupling means 26.

An opening 56 for the fluidizing air is provided in the fluidizing channel 36 in the region of the conduit joint. The fluidizing base 42 is glued in this region so that no fluidizing air can pass through. The bulk material is indicated only by the broken line 46; it can however be readily seen that the bulk material flows over the glued part of the fluidizing base 42 forming a slight buckle as it does so.

Figure 6:
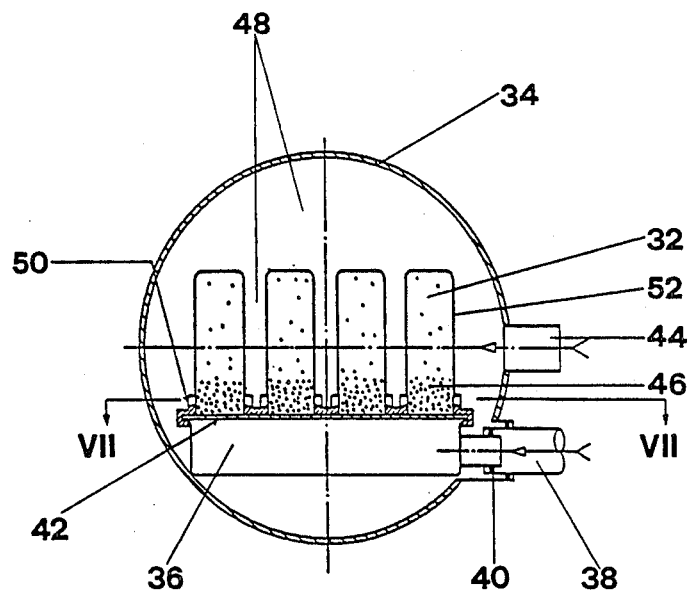
FIG. 6: A cross-section through a conduit with four feeder channels.
Figure 7:
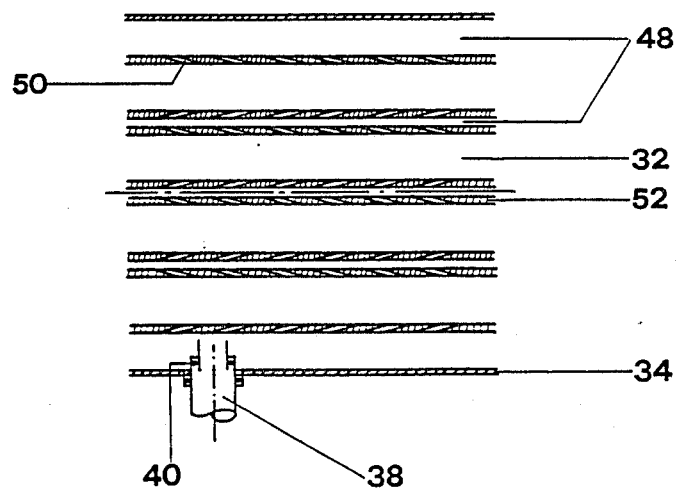
FIG. 7: A horizontal section along line VII—VII in FIG. 6.

FIGS. 6 and 7 differ from FIGS. 3 and 4 in that instead of one feeder channel there is a plurality of such channels 32. This is necessary because the impeller nozzles 50 have only limited effect, due to the width of the feeder channels 32. All impeller nozzles 50 are fed with air from the communicating space 48.

The fluidizing base 42 and the fluidizing channel 36 extend over the width of all feeder channels 32 and are not subdivided.

It can be seen particularly well in FIG. 7 that all impeller nozzles 50 are equally spaced at regular intervals. With an alternating arrangement the bulk material would be tossed around in the feeder channel 32.

Figure 8:
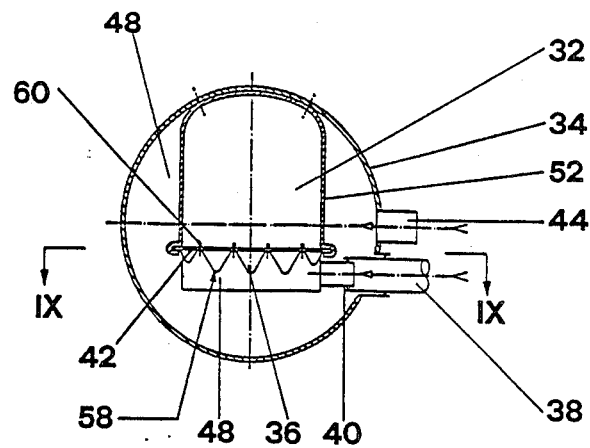
FIG. 8: A cross-section through a conduit with impeller nozzles fixed in a support base.
Figure 9:
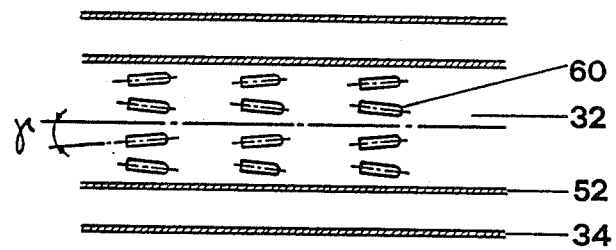
FIG. 9: A horizontal section along line IX—IX in FIG. 8.

The conduit shown in FIGS. 8 and 9 is likewise conceived for large capacity transportation. The, approximately 50 cm wide, feeder channel 32 is provided with impeller nozzles, not shown here, in the sidewall 52 of the feeder channel 32 as in FIGS. 3 and 4.

The fluidizing base 42 rests on a support base 58 which is wave-shaped in cross-section, and features therefore a plurality of fluidizing channels 36 running in the longitudinal direction of the conduit. Impeller nozzles 60 with inclined bore are securely mounted in the support base 58 where they contact the fluidizing base 42. These nozzles 60 are fed from the communicating space 48.

In FIG. 9 it can be clearly seen that the impeller nozzles 60 are not exactly oriented in the direction of material transport but deviate from this by an angle $\gamma$. In the version shown in FIG. 9 the angle $\gamma$ is about 5°. Nozzles 60 lying behind each other do not therefore jet the material onto the next nozzle 60 downstream.

Figure 10:
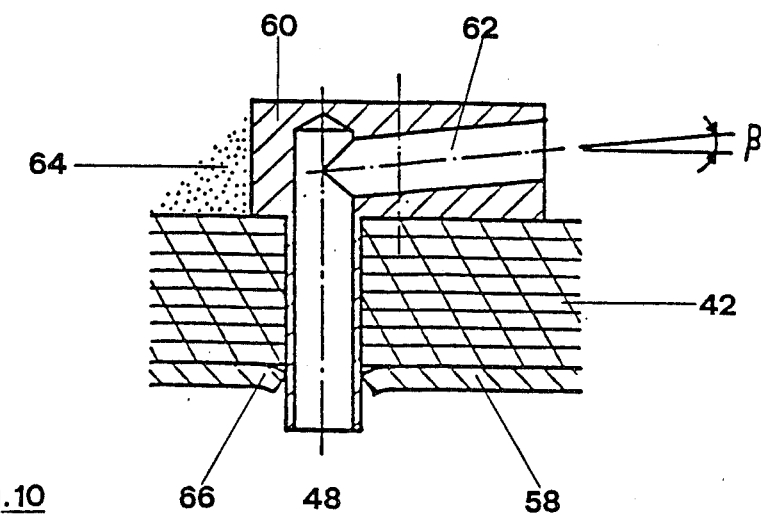
FIG. 10: A vertical longitudinal section through an impeller nozzle fixed in the support base.

FIG. 10 shows on a larger scale an impeller nozzle 60 with inclined outlet bore 62. The axis of this bore which leads to the nozzle outlet runs upwards at an angle $\beta$ from the horizontal so that the fluidizing base is not jetted with the bulk material. In the present case the angle $\beta$ is 5°. Alternatively, the outlet of the nozzles could be horizontal.

Although the outer cross-section of the impeller nozzle 60 is kept as small as possible, a pile-up 64 of bulk material forms upstream of each nozzle. In FIG. 10 only this pile-up 64 of material is shown; the rest of the bulk material has been omitted for reasons of clarity.

Before the impeller nozzle is installed, a sharp steel spike is inserted in the nozzle. The nozzle with the spike is then pushed through the fabric forming the fluidizing base 42 and through the support base 58 until the nozzle 60 rests flush against the fluidizing base 42. A brow 66 of support base material forms against the impeller nozzle 60 clamping it securely and air-tight in place.

Figure 11:
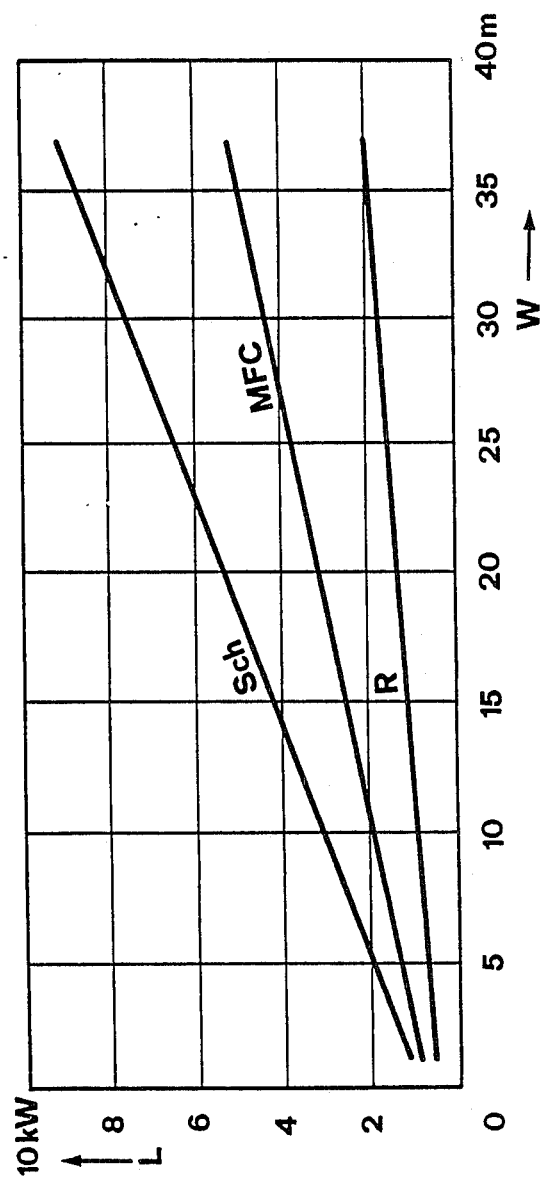
FIG. 11: A comparison of the energy consumption of the conduit according to the invention with those of a screw conveyor (Sch) and a known conduit transport facility (R).

FIG. 11 shows the results from trials comparing the power consumption required for transporting cement over a distance w, whereby the amount transported amounted to 40 t/h. A screw-type conveyor, indicated by Sch, clearly consumes the largest amount of power. The power consumption of a pneumatically powered conduit indicated by R inclined at a 10% gradient is very small. However, it must be taken into account that to achieve this slope a great deal of construction work and space are required. The power consumption of the device according to the version shown in FIGS. 3 and 5 is indicated by MFC. Although the conduit in this case, as with the screw type conveyor, is horizontal the power consumption is small and, at the same time, the amount of construction work required is small.

What is claimed is:

1. Conduit for transporting finely-divided or fine-granular, dry bulk materials which comprises an approximately horizontally running conduit including a material conveyance zone comprising at least one closed feeder channel, a zone for introducing a fluidizing medium into said material conveyance zone to fluidize said materials comprising a closed fluidizing channel, a material which is permeable to gas and fluids separating said introducing zone and material conveyance zone comprising a fluidizing base between said feeder channel and fluidizing channel, impeller nozzles with at least one outlet for a gaseous or fluid impeller medium for feeding said impeller medium into said feeder channel at a higher pressure than said fluidizing medium for transporting said fluidized materials, and means for introducing a fluidizing medium into said feeder channel to fluidize said materials and substantially simultaneously feed impeller medium into said feeder channel via said impeller nozzles at a higher pressure than said fluidized materials for transporting finely-divided or fine-granular, dry bulk materials.

2. Conduit according to claim 1 wherein said impeller nozzles are adjacent said fluidizing base.

3. Conduit according to claim 1 wherein said conduit includes an outer pipe that encloses said feeder channel and fluidizing channel.

4. Conduit according to claim 3 wherein said outer pipe is round in cross-section.

5. Conduit according to claim 3 including a pipe for supplying the impeller medium connected to the outer pipe of the conduit, a space between the outer pipe and the feeder channel, wherein said nozzles communicate with said space.

6. Conduit according to claim 1 including a plurality of feeder channels.

7. Conduit according to claim 1 including a plurality of fluidizing channels.

8. Conduit according to claim 1 wherein said feeder channel includes side walls having a lowest region adjacent said fluidizing base, wherein the impeller nozzles are situated in said lowest region of the sidewalls of the feeder channel at the same points on opposite walls and on at least one plane.

9. Conduit according to claim 8 wherein said nozzles have a horizontal spacing of 3-10 cm.

10. Conduit according to claim 8 wherein the impeller nozzles lie at a horizontal angle ($\alpha$) of 10°-30° with respect to the sidewalls of the feeder channel.

11. Conduit according to claim 10 wherein said nozzles have a bore of 1-2 mm.

12. Conduit according to claim 1 wherein the fluidizing base includes a support base in which impeller nozzles are securely fixed such that they are spaced apart, transverse to the direction of material transport.

13. Conduit according to claim 12 wherein the outlet of the nozzles point slightly upwardly.

14. Conduit according to claim 12 wherein the impeller nozzles are oriented at an angle with respect to the longitudinal direction of the conduit.

15. Conduit according to claim 14 wherein the distance between the vertical plane through the longitudinal axis of one of said oriented impeller nozzles and the vertical plane of the next impeller nozzle in the direction of transportation is 2 to 3 times the diameter of the outlet opening.

16. Conduit according to claim 1 including supply pipes communicating with said conduit for the fluidizing and impeller actions leading to a common power source.

17. Conduit according to claim 1 wherein said zone for introducing a fluidizing medium into said material conveyance zone is operative to introduce said fluidizing medium at a positive pressure of 100-500 mm water column.

18. Conduit according to claim 17 wherein said impeller nozzles are operative to introduce said impeller medium at a positive pressure of 700-1500 mm water column.

19. Method for transporting finely-divided or fine-granular, dry bulk materials which comprises: transporting said materials in a material conveyance zone comprising at least one closed feeder channel, providing a zone for introducing a fluidizing medium into the material conveyance zone comprising a closed fluidizing channel, separating the introducing zone from the material conveyance zone by a material which is permeable to gases and fluids, and introducing a fluidizing medium into said feeder channel to fluidize said materials, feeding impeller medium into said feeder channel via impeller nozzles at a higher pressure than said fluidizing medium for transporting said fluidized materials.

20. Method according to claim 19 wherein dust charged air is formed in the material conveyance zone and the dust-charged air is sucked away from the feeder channel by a relative negative pressure of 20 mm water column.

21. Method according to claim 19 wherein said materials are transported via a plurality of closed feeder channels.

22. Method according to claim 19 wherein said fluidizing medium is introduced into said feeder channel at a positive pressure of 100-500 mm water column.

23. Method according to claim 22 including feeding impeller medium into said feeder channel via impeller nozzles at a positive pressure of 700-1500 mm water column.

* * * * *